(12) United States Patent
Iwayasu et al.

(10) Patent No.: US 8,778,533 B2
(45) Date of Patent: *Jul. 15, 2014

(54) LITHIUM SECONDARY BATTERY

(75) Inventors: Norio Iwayasu, Hitachinaka (JP);
Jinbao Zhao, Xiemen (CN); Hidetoshi Honbo, Hitachinaka (CN)

(73) Assignee: Hitachi, Ltd., Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 13/311,583

(22) Filed: Dec. 6, 2011

(65) Prior Publication Data

US 2012/0141867 A1    Jun. 7, 2012

(30) Foreign Application Priority Data

Dec. 6, 2010    (JP) .................................. 2010-271112

(51) Int. Cl.
*H01M 10/02* (2006.01)
*C08F 2/00* (2006.01)
*C08F 230/02* (2006.01)

(52) U.S. Cl.
USPC .......................................... 429/188; 521/38

(58) Field of Classification Search
USPC .......................................... 429/188; 521/38
See application file for complete search history.

(56) References Cited

U.S. PATENT DOCUMENTS

| | | |
|---|---|---|
| 2003/0040593 A1 | 2/2003 | Saegusa et al. |
| 2010/0216029 A1 | 8/2010 | Iwayasu |
| 2011/0123871 A1 | 5/2011 | Nakagawa et al. |
| 2011/0189550 A1 | 8/2011 | Zhao et al. |
| 2011/0269026 A1 | 11/2011 | Zhao et al. |

FOREIGN PATENT DOCUMENTS

| | | |
|---|---|---|
| JP | 2003-192727 | 7/2003 |
| JP | 2005-116424 | 4/2005 |
| JP | 2007-115583 | 5/2007 |
| JP | 2009-295507 | 12/2009 |
| JP | 2010-198888 | 9/2010 |
| JP | 2011-159550 | 8/2011 |
| JP | 2011-233351 | 11/2011 |

OTHER PUBLICATIONS

JP Office Action of Appln. No. 2010-271112 dated Sep. 24, 2013.

*Primary Examiner* — Carlos Barcena
(74) *Attorney, Agent, or Firm* — Antonelli, Terry, Stout & Kraus, LLP.

(57) ABSTRACT

An electrolyte includes a mixture of polymerizable compounds, or a polymer, in which the mixture includes a polymerizable compound having an aromatic functional group and a polymerizable functional group, and a polymerizable compound having a phosphorus-containing functional group that contains phosphorus, and having a polymerizable functional group, and in which the polymer has residues of each of the phosphorus-containing functional group, the aromatic functional group and the polymerizable functional group.

9 Claims, 2 Drawing Sheets

LITHIUM SECONDARY BATTERY

CLAIM OF PRIORITY

The present application claims priority from Japanese Patent application serial No. 2010-271112, filed on Dec. 6, 2010, the content of which is hereby incorporated by reference into this application.

BACKGROUND OF THE INVENTION

1. Field of the Invention

The present invention relates to a lithium secondary battery.

2. Description of Related Art

Lithium secondary batteries have high energy densities and are widely used in notebook computers, and mobile phones, etc., taking advantage of the characteristics. In recent years, electric vehicles draw attentions from the viewpoint of preventing a global warming with an increase in carbon dioxide, and therefore it is also considered to apply the lithium secondary batteries as their power sources.

Although the lithium secondary batteries have such excellent characteristics, there are challenges with them. One of the challenges is to enhance the safety thereof, and among them, it is an important challenge to secure the safety when overcharged.

When a lithium battery is overcharged, the thermal stability thereof is decreased, thereby possibly causing the safety thereof to be decreased. Accordingly, current lithium secondary batteries have a control circuit for stopping charge to secure the safety thereof when an overcharged state is detected. The overcharged state is detected by monitoring a battery voltage. However, the difference between the operating voltage of a battery and the voltage at an overcharged state is small, and hence it has been difficult to properly detect overcharge with the control circuit. In addition, there is the possibility that overcharge may be caused if a failure occurs in the control circuit, and accordingly it is important to secure the safety of the lithium secondary battery itself when overcharged.

A technique that a phosphate is added in a battery to enhance the safety thereof is disclosed in Japanese Patent Application Laid-Open No. 2009-295507.

A technique that a phosphazene compound is added in a battery to enhance the safety thereof is disclosed in Japanese Patent Application Laid-Open No. 2005-116424.

In addition, a technique that a phosphate or a phosphazene compound is added in a battery is disclosed in Japanese Patent Application Laid-Open No. 2007-115583.

SUMMARY OF THE INVENTION

In a lithium secondary battery according to the present invention, an electrolyte includes a mixture of polymerizable compounds, or a polymer, in which the mixture is composed of a polymerizable compound having an aromatic functional group and a polymerizable functional group, and a polymerizable compound having a phosphorus-containing functional group that contains phosphorus, and having a polymerizable functional group, and in which the polymer has residues of each of the phosphorus-containing functional group, the aromatic functional group and the polymerizable functional group.

According to the present invention, the safety of the battery when overcharged can be enhanced without the performance of the battery being decreased.

DETAILED DESCRIPTION OF THE PREFERRED EMBODIMENTS

Figure 1:
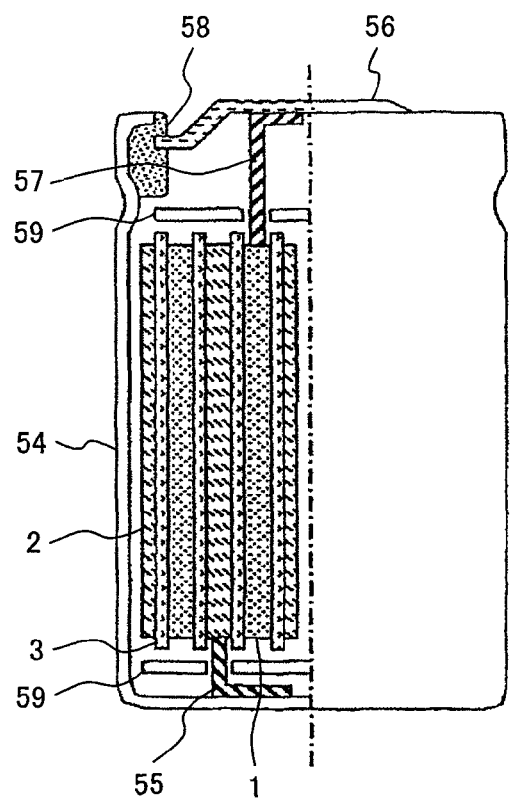
FIG. 1 is a partial cross-sectional view illustrating a lithium secondary battery (a tubular lithium ion battery) according to an example.

Each of a phosphate compound and a phosphazene compound has an effect of enhancing the thermal stability of a positive electrode when overcharged, but causes the thermal stability of a negative electrode to be decreased, and hence it is difficult to secure the stability as a battery.

An object of the present invention is to secure the safety of a battery when overcharged, by selectively forming a phosphorus-containing polymer layer having a radical trap effect on a positive electrode having a high potential when overcharged.

We have studied intensively. As a result, we have found an overcharge inhibitor which reacts in case that a positive electrode has a high potential at overcharged state to form a phosphorus-containing polymer layer having a radical trap effect on the positive electrode. We have also found that this overcharge inhibitor has high electrochemical stability within the operating voltage of a battery and can be used without the performance of the battery being impaired.

Hereinafter, a lithium secondary battery according to an embodiment of the present invention and a polymer to be used therein, and an electrolyte solution for the lithium secondary battery and an overcharge inhibitor for the lithium secondary battery will be described. The lithium secondary battery is also referred to as a lithium ion secondary battery herein.

The lithium secondary battery comprises a positive electrode, a negative electrode and an electrolyte.

In the lithium secondary battery, the electrolyte includes a mixture of polymerizable compound or a polymer, in which the mixture is composed of a polymerizable compound having an aromatic functional group and a polymerizable functional group, and a polymerizable compound having both a phosphorus-containing functional group that contains phosphorus and a polymerizable functional group, and in which the polymer has residues of each of the phosphorus-containing functional group, the aromatic functional group and the polymerizable functional group.

In the lithium secondary battery, the mixture is further composed of a polymerizable compound having both a highly polar functional group with a functional group having high polarity and a polymerizable functional group; and the polymer further has the highly polar functional group.

In the lithium secondary battery, the aromatic functional group has the phosphorus-containing functional group.

In the lithium secondary battery, the polymerizable compound or the polymer has a hydrocarbon group or an oxyalkylene group each having 1 to 20 carbon atoms between the aromatic functional group and the polymerizable functional group.

In the lithium secondary battery, the electrolyte is composed of a polymerizable compound represented by the following chemical formula (1) or (2); a polymerizable compound represented by the following chemical formula (3); and a polymerizable compound represented by the following chemical formula (4).

$$Z^1\text{—}X\text{-}A \quad \text{Chemical Formula (1)}$$

$$Z^1\text{-}A \quad \text{Chemical Formula (2)}$$

$$Z^2\text{—}Y \quad \text{Chemical Formula (3)}$$

$$Z^3\text{—}W \quad \text{Chemical Formula (4)}$$

In these chemical formulae, $Z^1$, $Z^2$ and $Z^3$ are polymerizable functional groups, respectively. X is a hydrocarbon group or an oxyalkylene group each having 1 to 20 carbon atoms. A is an aromatic functional group. Y is a phosphorus-containing functional group. W is a highly polar functional group.

That is, the electrolyte contains a mixture of the above polymerizable compounds.

The lithium secondary battery comprises a polymer which has polymerized the polymerizable compounds represented by the above chemical formulae (1), (3) and (4), or the polymerizable compounds represented by the above chemical formulae (2), (3) and (4).

In the lithium secondary battery, the electrolyte includes a polymer represented by the following chemical formula (5) or (6).

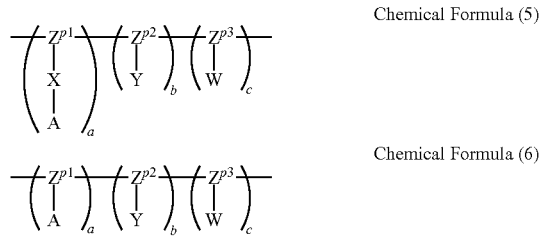

Chemical Formula (5)

Chemical Formula (6)

In these formulae, $Z^{p1}$, $Z^{p2}$ and $Z^{p3}$ are residues of the polymerizable functional group, respectively. X is a hydrocarbon group or an oxyalkylene group having 1 to 20 carbon atoms. A is an aromatic functional group. Y is a phosphorus-containing functional group that contains phosphorus. W is a highly polar functional group with a functional group having high polarity, and a, b and c are indicated by the unit of mol %.

In the lithium secondary battery, the electrolyte contains a polymer represented by the following chemical formula (7).

Chemical Formula (7)

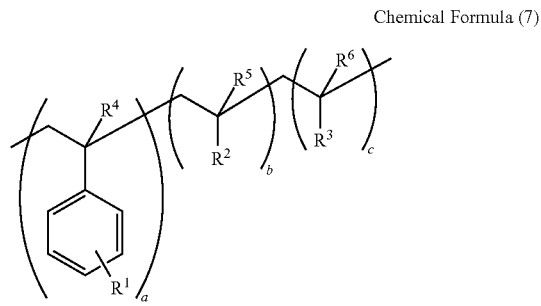

In this chemical formula, $R^1$ is a hydrogen atom, an aliphatic hydrocarbon group, an alicyclic hydrocarbon group or an aromatic group. $R^2$ is a phosphorus-containing functional group that contains phosphorus. $R^3$ is a functional group having an alkylene oxide group, a cyano group, an amino group or a hydroxyl group. Each of $R^4$, $R^5$ and $R^6$ is a hydrogen atom or a hydrocarbon group, and a, b and c are indicated by the unit of mol %.

The polymer is represented by the above chemical formula (5) or (6).

The polymer is represented by the above chemical formula (7).

The electrolyte solution for the lithium second battery contains the aforementioned polymerizable compound or the aforementioned polymer.

The overcharge inhibitor for the lithium secondary battery contains the aforementioned polymerizable compound or the aforementioned polymer as an effective component.

A method of producing the polymer comprises the steps of producing a mixture including both a polymerizable compound having an aromatic functional group and a polymerizable functional group, and a polymerizable compound having a phosphorus-containing functional group that contains phosphorus and a polymerizable functional group; and polymerizing the polymerizable compounds.

In the method of producing the polymer, the mixture further includes a polymerizable compound having both a highly polar functional group with a functional group having high polarity and a polymerizable functional group.

In the method of producing the polymer, the aforementioned mixture contains the polymerizable compound represented by the above chemical formula (1) or (2) and the polymerizable compound represented by the above chemical formula (3) and (4).

In the method of producing the polymer, the aforementioned mixture is made to react by mixing a polymerization initiator therein.

The polymerizable functional group is not particularly limited, as far as it generates a polymerization reaction. And an organic group having an unsaturated double bond such as a vinyl group, an acryloyl group or a methacryloyl group is preferably used.

Examples of the hydrocarbon group having 1 to 20 carbon atoms include aliphatic hydrocarbon groups such as a methylene group, ethylene group, propylene group, isopropylene group, butylene group, isobutylene group, dimethylethylene group, pentylene group, hexylene group, heptylene group, octylene group, isooctylene group, decylene group, undecylene group and dodecylene group; and alicyclic hydrocarbon groups such as a cyclohexylene group and dimethyl cyclohexylene group.

Examples of the oxyalkylene group include an oxymethylene group, oxyethylene group, oxypropylene group, oxybutylene group and oxytetramethylene group.

The aromatic functional group is a functional group which satisfies the Huckel rule. Specifically, examples of the aromatic functional group include a cyclohexyl benzyl group, biphenyl group, phenyl group, and naphthyl group, anthryl group, phenanthryl group, triphenylene group, pyrene group, chrysene group, naphthacene group, picene group, perylene group, pentaphene group, pentacene group and acenaphthylene group which are condensation products of the phenyl group, etc. A part of each of these aromatic functional groups may be substituted.

In addition, the aromatic functional group may contain elements other than carbon in its aromatic ring. Specifically, elements such as S, N, Si and O may be contained. From the viewpoint of an electric stability, a phenyl group, cyclohexylbenzyl group, biphenyl group, naphthyl group, anthracene group and tetracene group are preferred, and a cyclohexylbenzyl group and biphenyl group are particularly preferred among them. The polymer dissolved in an electrolyte solution can form a film on a positive electrode at the overcharged state by selecting a proper aromatic functional group, thereby allowing the thermal stability of the positive electrode to be enhanced.

The polymer means a compound obtained by polymerizing the polymerizable compound.

Although the polymerizable compound or the polymer can be used in the present invention, it is preferable from the viewpoint of the electrochemical stability to use a polymer that has been produced by beforehand polymerizing a polymerizable compound followed by purification. The polymerization may be performed by using any one of conventionally-known bulk polymerization, solution polymerization and emulsion polymerization. A polymerization method is not particularly limited, but radical polymerization is preferably used. In the polymerization, a polymerization initiator may or may not be used, but it is preferable to use a radical polymerization initiator in terms of easiness of handling. The polymerization method in which a radical polymerization initiator is used can be performed at a temperature range and for a polymerization period of time that are usually employed.

A blending amount of the polymerization initiator is within a range of 0.1 to 2 wt %, and preferably within a range of 0.3 to 5 wt % based on the polymerizable compound. Examples of the radical polymerization initiator include organic peroxides such as t-butylperoxy pivalate, t-hexylperoxy pivalate, methylethylketone peroxide, cyclohexanone peroxide, 1,1-bis(t-butylperoxy)-3,3,5-trimethylcyclohexane, 2,2-bis(t-butylperoxy)octane, n-butyl-4,4-bis(t-butylperoxy)valerate, t-butyl hydroperoxide, cumene hydroperoxide, 2,5-dimethylhexane-2,5-dihydroperoxide, di-t-butyl peroxide, t-butylcumyl peroxide, dicumyl peroxide, $\alpha,\alpha'$-bis(t-butylperoxy-m-isopropyl)benzene, 2,5-dimethyl-2,5-di(t-butylperoxy) hexane, benzoyl peroxide and t-butylperoxypropyl carbonate; and azo compounds such as 2,2'-azobisisobutyronitrile, 2,2'-azobis(2-methylbutyronitrile), 2,2'-azobis(4-methoxy-2,4-dimethylvaleronitrile), 2,2'-azobis(2,4-dimethylvaleronitrile), 1,1'-azobis(cyclohexane-1-carbonitrile), 2-(carbamoylazo)isobutyronitrile, 2-phenylazo-4-methoxy-2,4-dimethyl-valeronitrile, 2,2-azobis(2-methyl-N-phenylpropioneamidine)dihydrochloride, 2,2'-azobis[N-(4-chlorophenyl)-2-methylpropionamidine]dihydrochloride, 2,2'-azobis[N-hydroxyphenyl]-2-methylpropionamidine] dihydrochloride, 2,2'-azobis[2-methyl-N-(phenylmethyl) propioneamidine]dihydrochloride, 2,2'-azobis[2-methyl-N-(2-propenyl)propioneamidine]dihydrochloride, 2,2'-azobis (2-methylpropionamidine)dihydrochloride, 2,2'-azobis[N-(2-hydroxyethyl)-2-methylpropionamidine] dihydrochloride, 2,2'-azobis[2-(5-methyl-2-imidazoline-2-yl)propane]dihydrochloride, 2,2'-azobis[2-(2-imidazoline-2-yl)propane]dihydrochloride, 2,2'-azobis[2-(4,5,6,7-tetrahydro-1H-1,3-diazepine-2-yl) propane] dihydrochloride, 2,2'-azobis[2-(3,4,5,6-tetrahydropyrimidine-2-yl)propane]dihydrochloride, 2,2'-azobis[2-(5-hydroxy-3,4,5,6-tetrahydropyrimidine-2-yl) propane]dihydrochloride, 2,2'-azobis{2-[1-(2-hydroxyethyl)-2-imidazoline-2-yl] propane}dihydrochloride, 2,2'-azobis[2-(2-imidazoline-2-yl)propane], 2,2'-azobis{2-methyl-N-[1,1-bis (hydroxymethyl)-2-hydroxyethyl]propionamide}, 2,2'-azobis{2-methyl-N-[1,1-bis(hydroxymethyl)ethyl] propionamide}, 2,2'-azobis[2-methyl-N-(2-hydroxyethyl) propionamide], 2,2'-azobis(2-methylpropionamide) dihydrate, 2,2'-azobis(2,4,4-trimethylpentane), 2,2'-azobis (2-methylpropane), dimethyl 2,2'-azobisisobutyrate, 4,4'-azobis(4-cyanovaleric acid), and 2,2'-azobis[2-(hydroxymethyl) propionitrile].

Y in the above chemical formulae (3), (5) and (6) is a phosphorus-containing functional group that contains phosphorus. Examples of the phosphorus-containing functional group include a phosphoric acid derivative, a phosphazene derivative, etc.

In the phosphoric acid derivative, at least one of hydroxyl groups in phosphate group is substituted with a hydrocarbon group and an oxyalkylene group, etc. As the oxyalkylene group, an oxyalkylene group in which AO is an ethylene oxide and R is methyl is preferred, in which m is within a range of 1 to 20, preferably within a range of 1 to 10, and particularly preferably within a range of 1 to 5.

The phosphazene derivative is a compound having a double bond in which phosphorus and nitrogen are present as constituent elements. In the present invention, a circular or chained phosphazene derivative can be used.

W in the above chemical formulae (4), (5) and (6) is a highly polar functional group with a functional group having high polarity. Examples of the highly polar functional group include an oxyalkylene group $[(AO)_mR]$, cyano group, amino group, hydroxyl group, thiol group, etc. The affinity to the electrolyte solution can be increased by applying the highly polar functional group. As the oxyalkylene group, an oxyalkylene group in which AO is an ethylene oxide and R is methyl is preferred, in which m is within a range of 1 to 20, preferably within a range of 1 to 10, and particularly preferably within a range of 1 to 5.

The unit of each of a, b and c in the above chemical formulae (5), (6) and (7) is mol %, and a, b and c are respectively within the ranges of $0<a\le100$, $0<b<100$, and $0\le c<100$. In order to obtain the advantages of the present invention, a, b and c are important. Because the concentration of phosphorus is decreased if the value of b is small, the advantages of the invention are decreased. In addition, it becomes difficult for the polymer to be dissolved in the electrolyte solution because the polarity of the polymer is decreased if the value of a is increased, and hence the advantages of the invention are decreased.

From the aforementioned viewpoints, a is preferably within a range of 5 to 50%, and particularly preferably within a range of 10 to 40%. In addition, b is preferably within a range of 3 to 70%, and particularly preferably within a range of 10 to 50%.

A form in which the polymerizable compound and the polymer are present in the lithium secondary battery is not particularly limited, but it is preferable to use them in a coexistent manner in the electrolyte solution.

The polymerizable compound and the polymer may be dissolved in the electrolyte solution (form of solution) or be suspended therein.

The concentration (wt %) of each of the polymerizable compound and the polymer can be calculated by the following equation (1).

Concentration=(Weight of Polymerizable Compound and Polymer)/{(Weight of Electrolyte Solution)+ (Weight of Polymerizable Compound and Polymer)}×100    Equation (1)

In the above equation (1), the concentration thereof is within a range of 0 to 100 wt %, preferably within a range of 0.01 to 10 wt %, and particularly preferably within a range of 1 to 5 wt %. As the value of the concentration is larger, the ion conductivity of the electrolyte solution becomes smaller, thereby causing the performance of the battery to be decreased. On the contrary, as the value thereof is smaller, the advantages of the present invention are decreased.

The number average molecular weight (Mn) of the polymer is 50000000 or less, preferably 1000000 or less, and more preferably 100000 or less. A decrease in the performance of the battery can be suppressed by using a polymer having a small number average molecular weight.

The electrolyte solution can be obtained by dissolving a supporting electrolyte in a non-aqueous solvent.

The non-aqueous solvent is not particularly limited, as far as it can dissolve the supporting electrolyte; however, the following solvents are preferred. An organic solvent such as diethyl carbonate, dimethyl carbonate, ethylene carbonate, ethyl methyl carbonate, propylene carbonate, γ-butyllactone, tetrahydrofuran, dimethoxyethane or the like can be used, and a blend of two or more of them can also be used.

The supporting electrolyte is not particularly limited, as far as it can be dissolved in the non-aqueous solvent; however, the following substances are preferred. That is, an electrolyte salt such as $LiPF_6$, $LiN(CF_3SO_2)_2$, $LiN(C_2F_6SO_2)_2$, $LiClO_4$, $LiBF_4$, $LiAsF_6$, LiI, LiBr, LiSCN, $Li_2B_{10}Cl_{10}$, $LiCF_3CO_2$ or the like can be used, and a blend of two or more of them can also be used.

In addition, a compound having an unsaturated double bond such as vinylene carbonate, vinyl carbonate or the like may be added in the electrolyte solution.

Examples of a positive electrode active material include oxides that can occlude and discharge a lithium ion and is represented by the general formula of $LiMO_2$ (M is a transition metal), the oxides having a layer structure, such as $LiCoO_2$, $LiNiO_2$, $LiMn_{1/3}Ni_{1/3}Co_{1/3}O_2$ and $LiMn_{0.4}Ni_{0.4}Co_{0.2}O_2$; and a part of M in the oxides being substituted with at least one metallic element selected from the group consisting of Al, Mg, Mn, Fe, Co, Cu, Zn, Ti, Ge, W and Zr. In addition to those, oxides of Mn having a spinel-type crystalline structure, such as $LiMn_2O_4$ or $Li_{1+x}Mn_{2-x}O_4$ are also included. In addition, $LiFePO_4$ and $LiMnPO_4$ each having an olivine structure can also be used.

A material acquired by subjecting the easily-graphitized material to a high-temperature treatment at 2500° C. or higher, the easily-graphitized material being obtained from natural graphite, petroleum cokes, coal pitch cokes, etc.; mesophase carbon or amorphous carbon, carbon fiber, a metal alloyed with lithium, or a material which supports the metal on a surface of a carbon particle can be used as a negative electrode material. Herein, the aforementioned metal is a metal or alloy selected from the group consisting of lithium, silver, aluminum, tin, silicon, indium, gallium, magnesium, etc. Alternatively, the metal or an oxide of the metal can be used as a negative electrode. Lithium titanate can also be used.

A substance formed with a polymer such as polyolefin, polyamide or polyester, or glass cloth using fibrous glass fiber can be used for a separator. A material for the separator is not limited, as far as a reinforcing material by which the lithium battery is not adversely affected is used; however, polyolefin is preferably used.

Examples of the polyolefin include polyethylene polypropylene, etc., and those films can be used by being overlapped with each other.

The air permeability (sec/100 mL) of the separator is within a range of 10 to 1000, preferably within a range of 50 to 800, and particularly preferably within a range of 90 to 700.

An overcharge inhibitor is a substance that reacts at a predetermined voltage and has a function of suppressing overcharge. It is desirable that the reaction occurs at a voltage higher than the operating voltage of the battery. Specifically, the reaction occurs at 2 V or higher, and preferably 4.4 V or higher, based on $Li/Li^+$. If the value thereof is too small, the overcharge inhibitor is degraded in the battery, thereby causing the performance of the battery to be decreased.

Hereinafter, the present invention will be further specifically described by using examples; however, the invention is not limited to these examples.

<Method of Producing Electrodes>

<Positive Electrode>

CELLSEED (lithium cobalt oxide made by Nippon Chemical Industrial Co., Ltd.), SP270 (graphite made by Nippon Graphite Industries, Ltd.) and KF1120 (polyvinylidene fluoride made by Kureha Corporation) were mixed together at a weight ratio of 85:10:10, and the mixture was fed and mixed in N-methyl-2-pyrrolidone to produce a slurry solution. The slurry was applied to an aluminum foil having a thickness of 20 μm by a doctor blade method, followed by drying. The application amount of the mixture was 100 g/m². Thereafter, the dried article was pressed and an electrode was cut into a size of 10 cm², thus producing a positive electrode.

<Negative Electrode>

Artificial graphite and polyvinylidene fluoride were mixed at a weight rate of 90:10, and the mixture was fed and mixed in N-methyl-2-pyrrolidone to produce a slurry solution. The slurry was applied to a copper foil having a thickness of 20 μm by a doctor blade method, followed by drying. The application amount of the mixture was 40 g/m². The dried article was pressed such that the bulk density of the mixture was 1.0 g/cm³, and an electrode was cut out in a size of 10 cm², thus producing a negative electrode.

<Method of Producing Laminated Battery and Method of Evaluating the Battery>

A separator made of polyolefin was sandwiched between the positive electrode and the negative electrode to form an electrode group. The electrolyte solution was poured into it. Subsequently, a battery was enclosed by an aluminum laminate to produce the battery. Thereafter, the battery was initialized by repeating charge and discharge three times. The battery was charged up to a preset upper limit voltage with a current density of 0.1 mA/cm². The battery was discharged up to a preset lower limit voltage with the same current density. The upper limit voltage was 4.2 V and the lower limit voltage was 2.5 V. The discharge capacity obtained at the third cycle was made to be a battery capacity. Thereafter, the produced battery was overcharged up to 5.0 V with the same current density.

<Thermal Stability Test>

The overcharged battery was disjoined to separate the positive electrode and the negative electrode. The separated positive electrode or negative electrode was put into a measuring container, followed by pouring of the electrolyte solution. Subsequently, the measuring container was put into a differential scanning calorimeter (DSC) to heat the measuring sample at a heating rate of 1° C./min. The measurement was performed at a temperature within a range of 25° C. to 300° C.

Example 1

The monomer (1) (0.6 mol, 138 g) represented by the following chemical formula (8) and the monomer (2) (0.4 mol, 84 g) represented by the following chemical formula (9) were mixed together.

Chemical Formula (8)

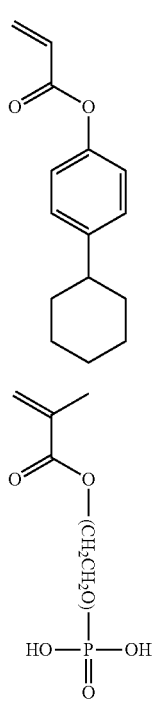

Chemical Formula (9)

One wt % of azobisisobutyronitrile (AIBN) was added therein as a polymerization initiator based on the weight of the total monomers, followed by stirring until the dissolution of the AIBN. Subsequently, the reaction solution was sealed and made to react in an oil bath held at 60° C. for 3 hours. After the reaction was completed, the reaction solution was added in 200 mL of methanol to obtain white precipitate. Thereafter, the above solution was filtered and dried at 60° C. under reduced pressure to obtain a polymer A.

The polymer A was added in an electrolyte solution (electrolyte salt:LiPF$_6$, solvent:EC/DMC/EMC=1:1:1 (volume ratio), concentration of the electrolyte salt 1 mol/L). The concentration of the polymer A was made to be 3 wt %. Hereinafter, the composition of the electrolyte solution containing the polymer A is referred to as an electrolyte solution A. Here, EC is ethylene carbonate, DMC is dimethyl carbonate, and EMC is ethyl methyl carbonate.

A battery was produced by using the electrolyte solution A, the properties of which were evaluated.

The battery capacity of the battery thus produced was 80 mAh. Subsequently, the positive electrode and the negative electrode were separated by disjoining the battery after the battery was overcharged. Each of the positive electrode and the negative electrode thus separated was put into a container for DSC measurement, and the container was sealed after the electrolyte solution was added therein. The container was put into a measuring apparatus to measure thermal stability.

The exothermic onset temperature of the positive electrode was 250° C., while that of the negative electrode was 187° C.

Example 2

The monomer (1) (0.5 mol, 115 g), the monomer (2) (0.4 mol, 84 g), and the monomer (3) (0.1 mol, 18.8 g) represented by the following chemical formula (10) were mixed together.

Chemical Formula (10)

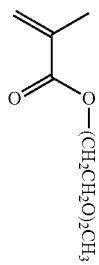

One wt % of azobisisobutyronitrile (AIBN) was added therein as a polymerization initiator based on the weight of the total monomers, followed by stirring until the dissolution of the AIBN. Subsequently, the reaction solution was sealed and made to react in an oil bath held at 60° C. for 3 hours. After the reaction was completed, the reaction solution was added in 200 mL of methanol to obtain white precipitate. Thereafter, the above solution was filtered and dried at 60° C. under reduced pressure to obtain a polymer B.

The polymer B was added in an electrolyte solution (electrolyte salt:LiPF$_6$, solvent:EC/DMC/EMC=1:1:1 (volume ratio), concentration of the electrolyte salt 1 mol/L). The concentration of the polymer B was made to be 3 wt %. Hereinafter, the composition of the electrolyte solution containing the polymer B is referred to as an electrolyte solution B.

A battery was produced by using the electrolyte solution B, the properties of which were evaluated.

The battery capacity of the battery thus produced was 80 mAh. Subsequently, the positive electrode and the negative electrode were separated by disjoining the battery after the battery was overcharged. Each of the positive electrode and the negative electrode thus separated was put into a container for DSC measurement, and the container was sealed after the electrolyte solution was added therein. The container was put into a measuring apparatus to measure thermal stability.

The exothermic onset temperature of the positive electrode was 255° C., while that of the negative electrode was 188° C.

Example 3

The monomer (1) (0.6 mol, 138 g) and the monomer (4) (0.4 mol, 168 g) represented by the following chemical formula (11) were mixed together.

Chemical Formula (11)

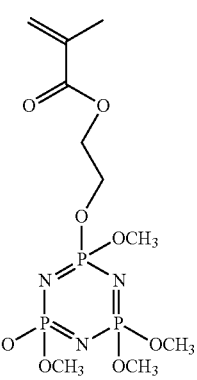

One wt % of azobisisobutyronitrile (AIBN) was added therein as a polymerization initiator based on the weight of the total monomers, followed by stirring until the dissolution of the AIBN. Subsequently, the reaction solution was sealed and made to react in an oil bath held at 60° C. for 3 hours. After the reaction was completed, the reaction solution was added in 200 mL of methanol to obtain white precipitate. Thereafter, the above solution was filtered and dried at 60° C. under reduced pressure to obtain a polymer C.

The polymer C was added in an electrolyte solution (electrolyte salt:$LiPF_6$, solvent:EC/DMC/EMC=1:1:1 (volume ratio), concentration of the electrolyte salt 1 mol/L). The concentration of the polymer C was made to be 3 wt %. Hereinafter, the composition of the electrolyte solution containing the polymer C is referred to as an electrolyte solution C.

A battery was produced by using the electrolyte solution C, the properties of which were evaluated.

The battery capacity of the battery thus produced was 80 mAh. Subsequently, the positive electrode and the negative electrode were separated by disjoining the battery after the battery was overcharged. Each of the positive electrode and the negative electrode thus separated was put into a container for DSC measurement, and the container was sealed after the electrolyte solution was added therein. The container was put into a measuring apparatus to measure thermal stability.

The exothermic onset temperature of the positive electrode was 241° C., while that of the negative electrode was 183° C.

Example 4

The monomer (1) (0.5 mol, 115 g), the monomer (4) (0.4 mol, 168 g) and the monomer (3) (0.1 mol, 18.8 g) were mixed together. One wt % of azobisisobutyronitrile (AIBN) was added therein as a polymerization initiator based on the weight of the total monomers, followed by stirring until the dissolution of the AIBN. Subsequently, the reaction solution was sealed and made to react in an oil bath held at 60° C. for 3 hours. After the reaction was completed, the reaction solution was added in 200 mL of methanol to obtain white precipitate. Thereafter, the above solution was filtered and dried at 60° C. under reduced pressure to obtain a polymer D.

The polymer D was added in an electrolyte solution (electrolyte salt:$LiPF_6$, solvent:EC/DMC/EMC=1:1:1 (volume ratio), concentration of the electrolyte salt 1 mol/L). The concentration of the polymer D was made to be 3 wt %. Hereinafter, the composition of the electrolyte solution containing the polymer D is referred to as an electrolyte solution D.

A battery was produced by using the electrolyte solution D, the properties of which were evaluated.

The battery capacity of the battery thus produced was 80 mAh. Subsequently, the positive electrode and the negative electrode were separated by disjoining the battery after the battery was overcharged. Each of the positive electrode and the negative electrode thus separated was put into a container for DSC measurement, and the container was sealed after the electrolyte solution was added therein. The container was put into a measuring apparatus to measure thermal stability.

The exothermic onset temperature of the positive electrode was 248° C., while that of the negative electrode was 185° C.

Example 5

A battery was produced to evaluate the properties thereof in the same way as in Example 2, except that the concentration of the polymer B was changed to 11% in Example 2.

The battery capacity was 73 mAh, and the exothermic onset temperature of the positive electrode was 254° C., while that of the negative electrode was 183° C.

Example 6

The monomer (1) (0.5 mol, 115 g), the monomer (2) (0.1 mol, 21 g) and the monomer (3) (0.4 mol, 75.5 g) were mixed together. One wt % of azobisisobutyronitrile (AIBN) was added therein as a polymerization initiator based on the weight of the total monomers, followed by stirring until the dissolution of the AIBN. Subsequently, the reaction solution was sealed and made to react in an oil bath held at 60° C. for 3 hours. After the reaction was completed, the reaction solution was added in 200 mL of methanol to obtain white precipitate. Thereafter, the above solution was filtered and dried at 60° C. under reduced pressure to obtain a polymer E.

The polymer E was added in an electrolyte solution (electrolyte salt:$LiPF_6$, solvent:EC/DMC/EMC=1:1:1 (volume ratio), concentration of the electrolyte salt 1 mol/L). The concentration of the polymer E was made to be 3 wt %. Hereinafter, the composition of the electrolyte solution containing the polymer E is referred to as an electrolyte solution E.

A battery was produced by using the electrolyte solution E, the properties of which were evaluated.

The battery capacity of the battery thus produced was 80 mAh. Subsequently, the positive electrode and the negative electrode were separated by disjoining the battery after the battery was overcharged. Each of the positive electrode and the negative electrode thus separated was put into a container for DSC measurement, and the container was sealed after the electrolyte solution was added therein. The container was put into a measuring apparatus to measure thermal stability. The exothermic onset temperature of the positive electrode was 245° C., while that of the negative electrode was 184° C.

Comparative Example 1

A battery was produced to evaluate the properties thereof in the same way as in Example 1, except that the polymer was not added in Example 1.

The battery capacity was 80 mAh, and the exothermic onset temperature of the positive electrode was 230° C., while that of the negative electrode was 180° C.

Comparative Example 2

A battery was produced to evaluate the properties thereof in the same way as in Example 1, except that trimethyl phosphate was added instead of the polymer in Example 1.

The battery capacity was 65 mAh, and the exothermic onset temperature of the positive electrode was 235° C., while that of the negative electrode was 155° C.

Comparative Example 3

A battery was produced to evaluate the properties thereof in the same way as in Example 1, except that phosphazene represented by the following chemical formula (12) was added instead of the polymer in Example 1.

Chemical Formula (12)

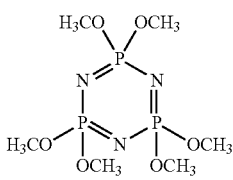

The battery capacity was 75 mAh, and the exothermic onset temperature of the positive electrode was 236° C., while that of the negative electrode was 171° C.

Table 1 summarizes the results of the examples and the comparative examples.

Figure 3:
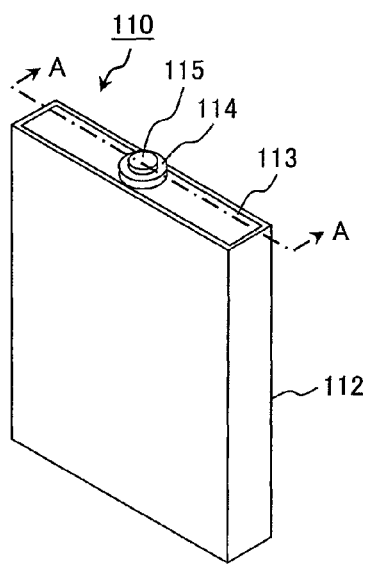
FIG. 3 is a perspective view illustrating a lithium secondary battery (a square lithium ion battery) according to an example.

FIG. 3 is a perspective view illustrating a secondary battery (a square battery) according to an example.

In this view, a battery 110 (non-aqueous electrolyte solution secondary battery) is obtained with a flat-shaped wound electrode body along with a non-aqueous electrolyte solution being enclosed into an outer packaging can 112 having a square shape. A terminal 115 is provided at the center of a cover plate 113 via an insulator 114.

Figure 4:
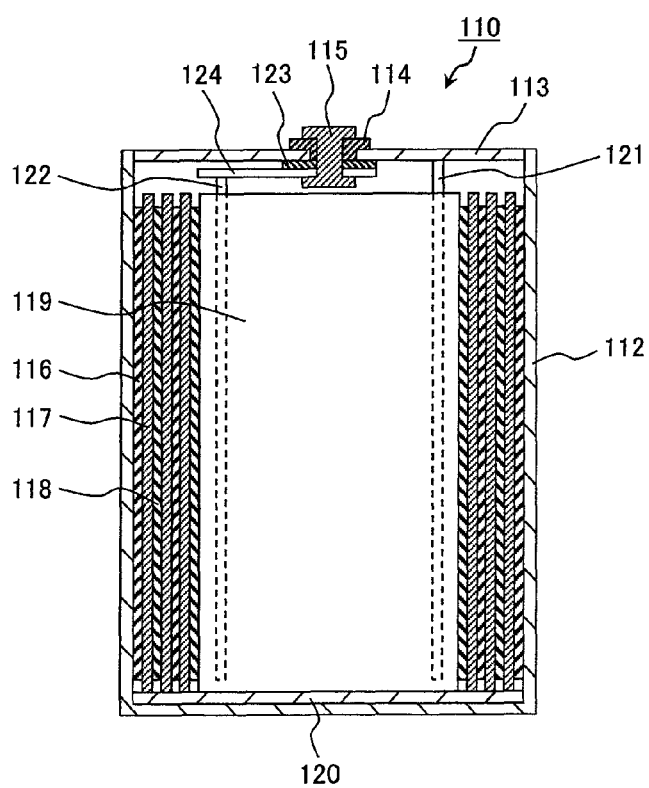
FIG. 4 is a cross-sectional view along A-A line in FIG. 3.

FIG. 4 is a cross-sectional view along A-A line in FIG. 3.

In this view, a positive electrode 116 and a negative electrode 118 are wound so as to sandwich a separator 117, thereby forming a flat-shaped wound electrode body 119. An insulator 120 is provided in the bottom portion of an outer

TABLE 1

| | Monomer | | | Copolymer Composition | | | Content/ | | Battery Capacity/ | Exothermic Onset Temperature of Positive | Exothermic Onset Temperature of Negative |
| --- | --- | --- | --- | --- | --- | --- | --- | --- | --- | --- | --- |
| | a | b | c | a | b | c | wt % | Polymer | mAh | Electrode/° C. | Electrode/° C. |
| Example 1 | Monomer(1) | Monomer(2) | — | 60 | 40 | — | 3 | Polymer A | 80 | 250 | 187 |
| Example 2 | Monomer(1) | Monomer(2) | Monomer(3) | 50 | 40 | 10 | 3 | Polymer B | 80 | 255 | 188 |
| Example 3 | Monomer(1) | Monomer(4) | — | 60 | 40 | — | 3 | Polymer C | 80 | 241 | 183 |
| Example 4 | Monomer(1) | Monomer(4) | Monomer(3) | 50 | 40 | 10 | 3 | Polymer D | 80 | 248 | 185 |
| Example 5 | Monomer(1) | Monomer(2) | Monomer(3) | 50 | 40 | 10 | 11 | Polymer B | 73 | 254 | 183 |
| Example 6 | Monomer(1) | Monomer(2) | Monomer(3) | 50 | 10 | 40 | 3 | Polymer E | 80 | 245 | 184 |
| Comparative Example 1 | | — | | | | | — | Not Included | 80 | 230 | 180 |
| Comparative Example 2 | | Trimethyl Phosphate | | | | | 3 | — | 65 | 235 | 155 |
| Comparative Example 3 | | Phosphazene | | | | | 3 | — | 75 | 236 | 171 |

Hereinafter, the configuration of a lithium secondary battery according to an example will be described with reference to the accompanying drawings.

FIG. 1 is a partial cross-sectional view illustrating a lithium secondary battery (a tubular lithium ion battery).

A positive electrode 1 and a negative electrode 2 are wound into a cylindrical shape in a state where a separator 3 is sandwiched by them, so that the electrodes 1 and 2 are not in direct contact with each other, thereby forming an electrode group. A positive electrode lead 57 is attached to the positive electrode 1, and a negative electrode lead 55 is attached to the negative electrode 2.

The electrode group is inserted into a battery can 54. Insulating plates 59 are installed in the bottom portion and the upper portion of the battery can 54 such that the electrode group is not in direct contact with the battery can 54. An electrolyte solution is poured in the battery can 54.

The battery can 54 is tightly sealed in a state of being insulated from a cover portion 56 via a packing 58.

Figure 2:
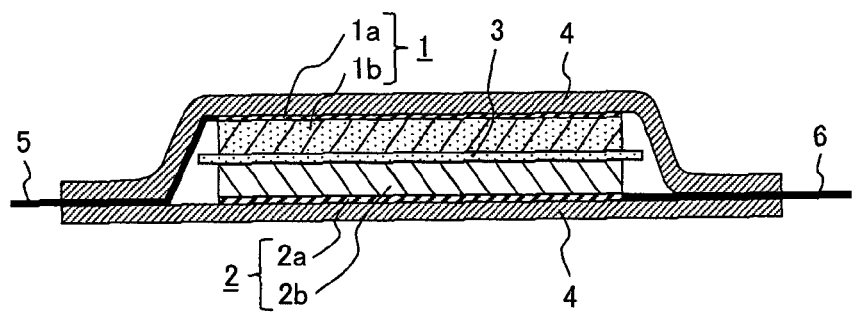
FIG. 2 is a cross-sectional view illustrating a lithium secondary battery (a laminated lithium ion battery) according to an example.

FIG. 2 is a cross-sectional view illustrating a secondary battery (a laminate-type cell) according to an example.

The secondary battery illustrated in this view has a structure in which a laminated body in which a positive electrode 1 and a negative electrode 2 are laminated so as to sandwich a separator 3 by them is tightly sealed along with a non-aqueous electrolyte solution by a packaging body 4. The positive electrode 1 includes a positive current collector 1a and a positive electrode mixture layer 1b, while the negative electrode 2 includes a negative current collector 2a and a negative electrode mixture layer 2b. The positive current collector 1a is connected to a positive electrode terminal 5, while the negative current collector 2a is connected to a negative electrode terminal 6.

packaging can 112 such that the positive electrode 116 and the negative electrode 118 do not short-circuit with each other.

The positive electrode 116 is connected to the cover plate 113 via a positive electrode lead body 121. On the other hand, the negative electrode 118 is connected to the terminal 115 via a negative electrode lead body 122 and a lead plate 124. An insulator 123 is sandwiched such that the lead plate 124 and the cover plate 113 are not in direct contact with each other.

The configuration of the secondary battery according to each of the above examples is illustrated as a mere example, and therefore the second batteries according to the present invention should not be limited to these configurations, but include all configurations to each of which the aforementioned overcharge inhibitor has been applied.

What is claimed is:

1. A polymer represented by the following chemical formula (5) or (6):

Chemical Formula (5)

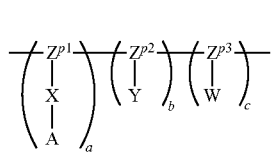

Chemical Formula (6)

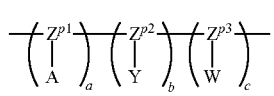

wherein, $Z^{p1}$, $Z^{p2}$ and $Z^{p3}$ are residues of a polymerizable functional group, respectively; X is a hydrocarbon group or an oxyalkylene group having 1 to 20 carbon atoms; A is an aromatic functional group; Y is a phosphorus-containing functional group that contains phosphorus; W is a polar functional group with a functional group having polarity; and a, b and c are indicated by a unit of mol %.

2. The polymer according to claim 1, represented by the following chemical formula (7):

Chemical Formula (7)

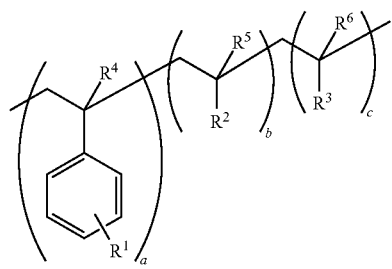

$R^1$ is a hydrogen atom, an aliphatic hydrocarbon group, an alicyclic hydrocarbon group or an aromatic group; $R^2$ is a phosphorus-containing functional group that contains phosphorus; $R^3$ is a functional group having an alkylene oxide group, a cyano group, an amino group or a hydroxyl group; each of $R^4$, $R^5$ and $R^6$ is a hydrogen atom or a hydrocarbon group; and a, b and c are indicated by a unit of mol %.

3. The polymer according to claim 1, wherein W is selected from the group consisting of an oxyalkylene group $(AO)_m R$, a cyano group, an amino group, a hydroxyl group and a thiol group.

4. The polymer according to claim 3, wherein W is an oxyalkylene group $(AO)_m R$ in which AO is an ethylene oxide, R is methyl and m is within a range of 1 to 20.

5. The polymer according to claim 1, wherein Y has the following Chemical Formula (9) or (11):

Chemical Formula (9)

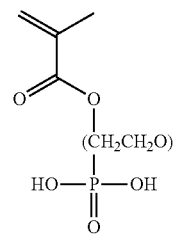

Chemical Formula (11)

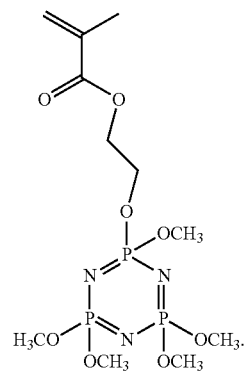

6. An electrolyte solution for a lithium secondary battery containing the polymer according to claim 1.

7. An overcharge inhibitor for a lithium secondary battery containing the polymer according to claim 1.

8. A lithium secondary battery comprising:
a positive electrode;
a negative electrode; and
an electrolyte including the polymer according to claim 1.

9. A lithium secondary battery comprising:
a positive electrode;
a negative electrode; and
an electrolyte which includes the polymer according to claim 2.

* * * * *